(12) United States Patent
Petersen et al.

(10) Patent No.: US 11,947,112 B2
(45) Date of Patent: Apr. 2, 2024

(54) OPTICAL ARRANGEMENT OF SMART GLASSES FOR SCANNING SURFACE

(71) Applicants: Robert Bosch GmbH, Stuttgart (DE); TRUMPF Photonic Components GmbH, Ulm (DE)

(72) Inventors: Andreas Petersen, Stuttgart (DE); Thomas Alexander Schlebusch, Stuttgart (DE); Hans Spruit, Waalre (NL); Jochen Hellmig, Valkenswaard (NL)

(73) Assignees: Robert Bosch Gmbh, Stuttgart (DE); Trumpf Photonic Components GmbH, Ulm (DE)

( * ) Notice: Subject to any disclaimer, the term of this patent is extended or adjusted under 35 U.S.C. 154(b) by 0 days.

(21) Appl. No.: 18/030,818

(22) PCT Filed: Oct. 12, 2021

(86) PCT No.: PCT/EP2021/078098
§ 371 (c)(1),
(2) Date: Apr. 7, 2023

(87) PCT Pub. No.: WO2022/084092
PCT Pub. Date: Apr. 28, 2022

(65) Prior Publication Data
US 2023/0400689 A1    Dec. 14, 2023

(30) Foreign Application Priority Data
Oct. 20, 2020    (DE) .................... 10 2020 127 594.3

(51) Int. Cl.
*G02B 27/01*    (2006.01)
*G02B 27/18*    (2006.01)
*G02B 27/28*    (2006.01)

(52) U.S. Cl.
CPC .......... *G02B 27/017* (2013.01); *G02B 27/18* (2013.01); *G02B 27/283* (2013.01);
(Continued)

(58) Field of Classification Search
CPC .... G02B 27/017; G02B 27/18; G02B 27/283; G02B 2027/0105; G02B 2027/0174; G02B 2027/0178; G02B 2027/0187
See application file for complete search history.

(56) References Cited

U.S. PATENT DOCUMENTS 7,542,210 B2 *   6/2009   Chirieleison, Sr. ........................ G02B 27/0172
                                                                                    359/630
9,529,191 B2    12/2016   Sverdrup et al.
(Continued)

FOREIGN PATENT DOCUMENTS

DE    10 2008 033 767 A1    1/2010
DE    10 2018 216 033 A1    3/2020

OTHER PUBLICATIONS

International Search Report and Written Opinion from International Application No. PCT/EP2021/078098, dated Feb. 14, 2022, 11 pages.
(Continued)

*Primary Examiner* — Kwang-Su Yang
(74) *Attorney, Agent, or Firm* — Tucker Ellis LLP

(57) ABSTRACT

An optical arrangement of data smart glasses includes a first laser device configured to emit a projection light beam, a second laser device configured to emit a measuring light beam, a first scanner, a second scanner, and a beam combiner configured to bundle the projection light beam and the measuring light beam into a common light beam, wherein the first scanner is configured to deflect the projection light beam emitted by the first laser device in a first axis, and wherein the second scanner is configured to deflect the
(Continued)

common light beam focused by the beam combiner in a second axis.

13 Claims, 3 Drawing Sheets

(52) U.S. Cl.
CPC ............... *G02B 2027/0105* (2013.01); *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 10,265,709 B2 | 4/2019 | Lin | |
| 10,380,927 B1 | 8/2019 | Parcels | |
| 10,499,021 B2 | 12/2019 | Tardif et al. | |
| 2010/0110422 A1* | 5/2010 | Dennis | G01J 3/0237 356/301 |
| 2016/0033771 A1* | 2/2016 | Tremblay | G02B 26/10 359/851 |
| 2018/0246336 A1 | 8/2018 | Greenberg | |
| 2020/0192097 A1 | 6/2020 | Kim et al. | |
| 2022/0099813 A1* | 3/2022 | Gates | G01S 7/4817 |
| 2022/0123527 A1* | 4/2022 | Danziger | G02B 27/283 |

OTHER PUBLICATIONS

Office Action from corresponding German Application No. 10 2020 127 594.3 dated Nov. 27, 2020, 6 pages.

\* cited by examiner

OPTICAL ARRANGEMENT OF SMART GLASSES FOR SCANNING SURFACE

RELATED APPLICATION DATA

This application is a National Phase Application of International Application No. PCT/EP2021/078098 filed Oct. 12, 2021, which claims benefit of German Application No. DE 10 2020 127 594.3 filed Oct. 20, 2020, the entireties of which are incorporated by reference herein.

PRIOR ART

The present invention relates to an optical arrangement for smart glasses and to smart glasses.

It has been known to use oculography (also: eye tracking) in smart glasses which is intended for image projection, for example onto a users retina. Oculography is used, for example, to adjust a controller of a projection unit of the smart glasses, when displaying context-sensitive information. U.S. Pat. No. 7,637,615 B2 reveals such smart glasses with retina projection and eye tracking based on prism mirrors. Such smart glasses often have complex and elaborate design.

DISCLOSURE OF THE INVENTION

Contrary to this, the optical arrangement according to the invention having the features of claim 1 is characterized by a particularly simple, compact and inexpensive arrangement. This is achieved by an optical arrangement of smart glasses comprising a first laser device arranged to emit a projection light beam, a second laser device arranged to emit a measuring light beam, a first scanner, a second scanner, and a beam combiner. The beam combiner is arranged to combine the projection light beam and the measuring light beam into a common light beam, in particular such that the common light beam substantially propagates along a common axis. The first scanner is arranged to redirect the projection light beam emitted from the first laser device along a first axis. Furthermore, the second scanner is arranged to deflect the beam of light bundled by the beam combiner into a second axis, which in particular is arranged at an angle with respect to the first axis. It is particularly preferred for the two axes to be perpendicular to each other.

Preferably, the first scanner and the second scanner are each configured as uniaxial scanners. That is, the first scanner and the second scanner are each designed to enable a one-dimensional deflection of the corresponding light beam. For this purpose, the first scanner is preferably pivotable about the first axis. Similarly, the second scanner is preferably pivotable about the second axis.

During operation of the optical arrangement, the projection light beam can thus be scanned around both axes using both scanners. Thus, the projection light beam can two-dimensionally be scanned over a surface to be scanned.

In particular, the measuring light beam is exclusively deflected by the second scanner, i.e. it is one-dimensionally scanned over the surface to be scanned, preferably in the form of a scan line.

The optical arrangement has the advantage that all components may be combined in a single compact assembly. Due to the unique arrangement of the scanners and the beam combiner, several different functionalities may simultaneously be performed using this single assembly. Because the bundled common light beam exits the optical arrangement preferably at exactly one point, a particularly versatile and simple arrangement of the optical arrangement may be realized, for example when using smart glasses. The two scanners can be operated at different scanning frequencies to enable modes of operation of the two scanners that are optimally adapted to the respective requirements of the projection light beam and the measuring light beam. For example, one of the scanners can be operated more economically at lower requirements of the respective light beam. Furthermore, due to separate operability of the two scanners, particularly high precision, for example with regard to a high temporal and/or optical resolution, may be achieved by operating each of the scanners in the optimal operating range for the corresponding light beam. Preferably, two-dimensional scanning of the surface can be performed line by line. For this purpose, one of the scanners can be used as a line scanner, deflecting the laser spot along the line direction at a high scanning frequency. The other scanner can be used to gradually build up the image by deflecting the laser dot along a second axis at a correspondingly lower speed. It may be advantageous for the measuring light beam to be scanned only with the slow axis, as there may be interactions with the fast axis, or because the laser spot on the surface should have a limited velocity for measurement.

Further preferred embodiments of the invention will be set forth in the subclaims.

Particularly preferably, the first scanner is configured to scan the projection light beam with a first scan frequency, whereas the second scanner is configured to scan the common light beam with a second scan frequency, the second scan frequency being smaller than the first scan frequency. Preferably, the second scan frequency is at most one tenth of the first scan frequency. Particularly preferred, the first scan frequency is 10 kHz to 50 kHz. Preferably, the second scan frequency is 50 Hz to 200 Hz, more preferably 60 Hz.

Preferably, the first laser device comprises a projection unit arranged to project an image onto a retina of an eye of a user by means of the projection light beam. In particular, the projection light beam is thus visible light. By redirecting the projection light beam generated by the projection unit by means of both scanners, a two-dimensional image can be projected onto the retina of the eye of the user. In addition, when using the projection light beam for retinal projection, the first scanner can be operated at a high scan frequency to achieve sufficiently high temporal resolution so that optimally resolved images are displayed to the user, for example, without any flicker being detectable.

Particularly preferred, the second laser device has an eye tracking unit, which is set up to determine an optical path length of the measuring light beam based on laser feedback interferometry of the measuring light beam with a portion of the measuring light beam backscattered by the eye, and to determine a viewing direction of the eye based on the optical path length. Laser feedback interferometry is considered to be the detection and analysis of a superposition of the laser beam irradiated onto the eye with the backscattered portion of the irradiated laser beam, i.e. a detection and analysis of a resulting interference radiation. Based on laser feedback interferometry, the optical path length of the irradiated laser beam is determined. The optical path length is considered to be the product of a geometric distance covered by the irradiated laser beam from the laser source to the surface of the eye and a refractive index of the material present therein. This means that if the laser beam is irradiated in air (refractive index approx. 1) from a laser source directly onto the eye, the optical path length, in very good approximation, corresponds to the distance between the laser source and the eye. If the wavelength of the irradiated laser beam is known, the optical path length can be determined, for example, on the basis of constructive or destructive interference. Preferably, triangle-modulated laser light is emitted as the irradiated laser beam in the wavelength. The optical path length can be determined by laser feedback interferometry, i.e. by analyzing the interference of the irradiated laser beam and the backscattered portion of the irradiated laser beam, in particular by calculating an average of the resulting interference frequencies with respect to the two flanks of the triangle-modulated signal. For accurate detection, a modulation frequency preferably is a multiple of the second scan frequency. Particularly preferably, the modulation frequency at a second scan frequency of 60 Hz is in the range of 1 kHz to 130 MHz, preferably 5 kHz to 100 kHz, especially 10 kHz.

Preferably, the eye tracking unit is configured to detect an entry of the measuring light beam into the pupil of the eye based on the determined optical path length, and in particular to determine the viewing direction of the eye based on a scanner position of the second scanner upon a detected entry of the measuring light beam into the pupil.

Preferably, the first scanner and/or the second scanner comprises a micro mirror actuator. Preferably, both the first scanner and the second scanner each comprise a micro mirror actuator. For example, the micromirror actuator may be a MEMS actuated micromirror. Preferably, the micromirror actuator may be resonant in the corresponding axis. Alternatively, the micromirror actuator may be operated in the corresponding axis at a frequency lower than the resonant frequency. In this case, the micromirror actuator offers a particularly simple and cost-effective way of redirecting light generated using the two laser devices with particular precision and scanning it over the surface to be scanned.

Preferably, the beam combiner has a polarization beam splitter. Preferably, the projection light beam and the measuring light beam are polarized perpendicular to each other, especially in a region before they enter the polarization beam splitter. The projection light beam and the measuring light beam will thus be irradiated into the polarization beam splitter such that the polarization beam splitter bundles the measuring light beam and the projection light beam into the common light beam. A polarization beam splitter allows particularly simple and cost-effective design of the optical arrangement.

Preferably, the beam combiner has a holographic optical element. Particularly preferred, the holographic optical element is designed to deflect the projection light beam and the measuring light beam at different angles. This allows the optical arrangement to be particularly flexibly and, moreover, simply and inexpensively designed. Preferably, the corresponding deflection angles of the holographic optical element for the measuring light beam and the projection light beam can be adjusted as desired, so that any alignment of the projection light beam and the measuring light beam irradiated onto the holographic optical element relative to each other can be realized.

Preferably, the second laser device is configured to emit multiple, preferably parallel, measuring light beams. In particular, the multiple measuring light beams are emitted in a common plane and at uniform intervals. For example, this allows multiple parallel scan lines to be scanned onto the surface to be scanned. Thus, if the second laser device comprises an eye tracking unit, for example, optical path lengths can each be scanned along a plurality of parallel lines on the ocular surface to obtain particularly high accuracy in eye tracking.

Particularly preferred, the optical arrangement further comprises a beam splitter, which is configured and arranged such as to split the measuring light beam into at least two measuring light beams. Preferably, the beam splitter is arranged between the second laser device and the second scanner. In this way, several separate measuring light beams can be generated in a particularly simple manner, which are irradiated onto the surface to be scanned. The splitting of a single measuring light beam generated by the second laser device into several measuring light beams provides a particularly simple and cost-effective approach. Preferably, several measuring light beams emitted from the second laser device can also be split using the beam splitter, or alternatively using several beam splitters, so as to be able to scan an even larger number of measuring light beams over the surface to be scanned.

Preferably, the beam splitter is integrated into the second laser device. Alternatively, the beam splitter is arranged on the second laser device. Furthermore, the beam splitter may alternatively be integrated into the beam combiner. Furthermore, the optical arrangement may comprise a deflecting element for deflecting the measuring light beam, wherein, in another alternative, the beam splitter is integrated into the deflecting element. Depending on the variant, a particularly simple, cost-effective and space-saving design of the optical arrangement may thus be achieved.

Preferably, the second laser device emits a plurality of measuring light beams, with the beam splitter and the plurality of measuring light beams aligned to produce an interlaced line pattern of scan lines on the surface to be scanned. This means that using the beam splitter, the plurality of measuring light beams are each split into a plurality of further measuring light beams. For example, the beam splitter may be configured to split each incident measuring light beam into three separate measuring light beams. For example, if three measuring light beams are emitted from the second laser device, this results in a total of nine measuring light beams that are scanned over the surface to be scanned. In this context, an interlaced line pattern is considered to be a pattern of scanning lines scanned onto the surface to be scanned, such that the measuring light beams divided by means of the beam splitter cross each other downstream of the beam splitter, preferably each one impinging onto the surface to be scanned along a scanning line, wherein the scanning lines in particular are arranged at uniform intervals. In other words, when viewed along a direction on the surface to be scanned, exactly one scanning line of each of the three measuring light beams originally emitted from the second laser device is alternately located perpendicular to the scanning lines. In this way, it may be achieved that the individual divided measuring light beams of a certain measuring light beam originally emitted from the second laser device are further spaced apart on the surface to be scanned, to allow simple and unambiguous differentiation of these divided measuring light beams when evaluating the measurement results.

Particularly preferably, the optical arrangement further comprises a holographic optical element having a first holographic segment and a second holographic segment. The two holographic segments are configured such that a first scanning direction of a measuring light beam deflected at the first holographic segment is inclined at an angle in relation to a second scanning direction of a measuring light beam deflected at the second holographic segment. That is, when the measuring light beam impinges on the first holographic segment, the measuring light beam is deflected such that a resulting scan direction on the surface to be scanned corresponds to the first scan direction. Similarly, when the measuring light beam impinges on the second holographic segment, the second scanning direction corresponds to a resulting scanning direction on the surface to be scanned. That is, the two holographic segments cause different deflections of the measuring light beams. Preferably, the first scan direction and the second scan direction are perpendicular to each other, in particular on the surface to be scanned. In this way, particularly comprehensive and precise scanning of the surface to be scanned can be carried out by means of a simple arrangement.

Preferably, the second laser device has at least one surface emitter (also called vertical-cavity surface-emitting laser, or VCSEL for short) with an integrated photodiode. With such a second laser device, the eye movements can be detected using a particularly simple, compact and cost-effective design of the eye-tracking arrangement based on laser feedback interferometry. In particular, such a second laser device is suitably used for detection by means of the self-mixing effect. Preferably, the photodiode is used to detect the superposition of the irradiated laser beam and the backscattered portion directly within the laser cavity. Particularly preferred, the second laser device may comprise several surface emitters, each of which emits a separate laser beam.

Furthermore, the invention provides smart glasses comprising the described optical arrangement. Preferably, the smart glasses are a wearable device configured to be worn on a users head. Herein, the possibility of the optical arrangement being constructible as a single component has a particularly advantageous effect, for example to allow compact and flexible arrangement and low weight of the smart glasses and thus a high user comfort when using an optical arrangement operable by a rechargeable battery.

Preferably, the optical arrangement is arranged on an frame temple. In that the optical arrangement can be provided in a particularly compact manner and as a single device, particularly compact and thus user-friendly design of the smart glasses may also be enabled. In particular, the fact that all components can be arranged on the frame temple means that wires, for example, wires which have to be led over a joint between the frame temple and the spectacle-frame, may be omitted, which has a further advantageous effect on a cost-effective and simple design.

Particularly preferred, the smart glasses further comprise a lens comprising a holographic optical deflection element. Herein, the holographic optical deflection element is configured to deflect all light beams emitted from the optical arrangement in the direction of an eye of a user wearing the smart glasses. That is, the light beams deflected by means of the scanners of the optical arrangement are not directly irradiated onto the eye of the user, but are deflected via the holographic optical deflection element in the eyeglass lens.

BRIEF DESCRIPTION OF DRAWINGS

In the following, the invention will be described by means of example embodiments and the accompanying figures. In the figures, functionally equivalent components are identified by the same reference signs, wherein.

PREFERRED EMBODIMENTS OF THE INVENTION

Figure 1:
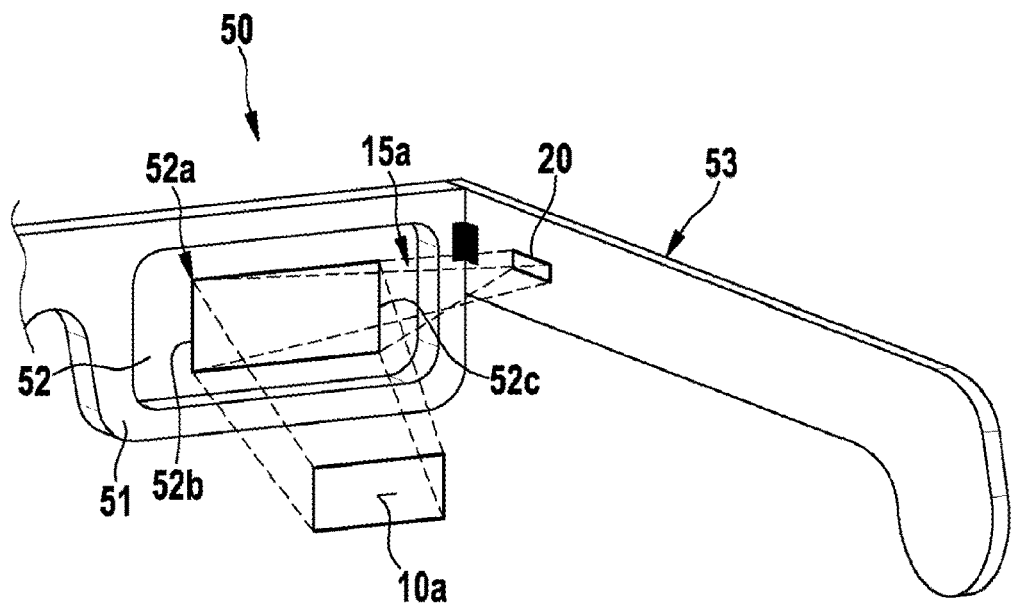
FIG. 1 is a simplified schematic view of smart glasses comprising an optical arrangement according to a first example embodiment of the invention.

FIG. 1 shows a simplified schematic view of a pair of smart glasses 50 having an optical arrangement 20 according to a first example embodiment of the invention.

The smart glasses 50 comprise a lens 52, a frame 51 in which the lens 52 is received, and a temple 53 for holding the smart glasses 50 on a users head. The smart glasses 50 are thus provided to be worn on a users head.

The smart glasses 50 comprise an optical arrangement 20 used to determine a viewing direction of an eye 10 of the user and to simultaneously project an image onto a retina of the eye 10 of the user. A detailed view of the optical arrangement 20 of the smart glasses 50 of FIG. 1 is shown in FIG. 2.

10 The retinal projection is performed by means of a projection light beam 11, and detection of the viewing direction is performed by means of a measuring light beam 12. The projection light beam 11 and the measuring light beam 12 are bundled within the optical arrangement 20 to form a common light beam 15a. As shown in FIG. 1, the common light beam 15a is directed in the direction of the lens 52 of the smart glasses 50 and is deflected therein by a holographic optical deflection element 52a embedded in the lens 52 in the direction of the eye 10 of the user. FIG. 1 shows in simplified form a surface 10a to be scanned.

Figure 2:
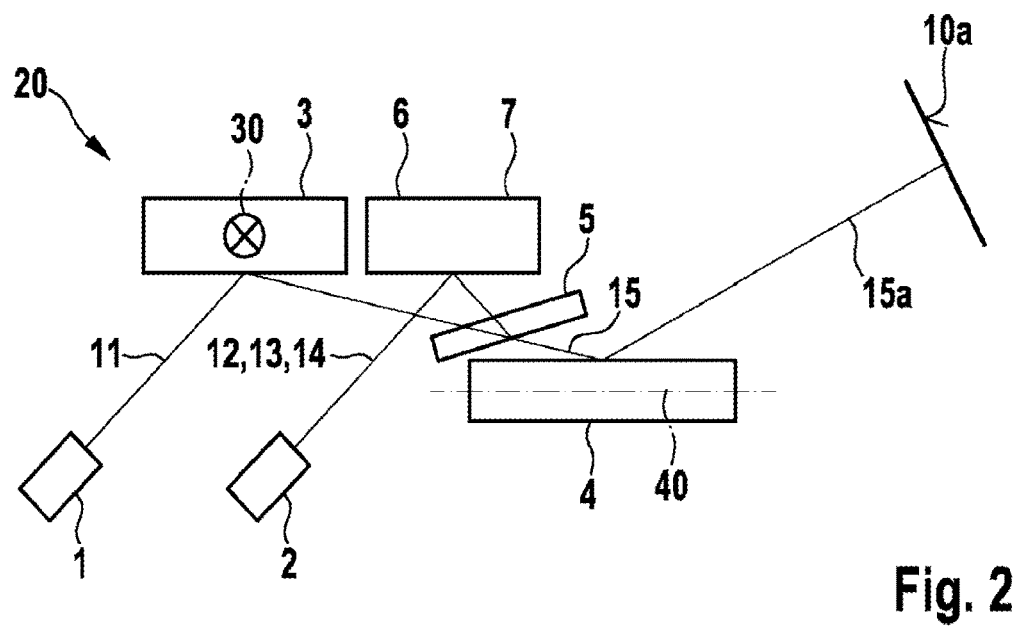
FIG. 2 is a detailed view of the optical arrangement of FIG. 1.

The optical arrangement 20 comprises a first laser device 1 having a projection unit which is configured to project the image 10 onto the retina by means of the projection light beam 11 (cf. FIG. 2). For example, the projection unit can be used to display an augmented or virtual reality. Furthermore, the optical arrangement comprises a second laser device 2 including a viewing detection unit, which is configured to emit the measuring light beam 12 and to determine a viewing direction of the eye 10. Preferably, the projection unit is coupled to the viewing detection unit, wherein the viewing detection unit is configured to actuate the projection unit in response to the determined viewing direction. For example, the projected image can be adjusted depending on the viewing direction.

In this regard, the optical arrangement 20 is characterized in that all components required for generating the common light beam 15a can be combined in a single component. In order to redirect and bundle the projection light beam 11 and the measuring light beam 12 accordingly, the optical arrangement 20 comprises a first scanner 3, a second scanner 4, and a beam combiner 5, as shown in particular in FIG. 2. The first scanner 3 and the second scanner 4 are each designed as single-axis micromirror detectors.

The first scanner 3 is configured to deflect the projection light beam 11 emitted by the first laser device 1 along a first axis 30. As a result, the projection light beam 11 is scanned as a line over the second scanner 4.

Using the beam combiner 5, the projection light beam 11 deflected by the first scanner 3 and the measuring light beam 12 deflected by a deflection element 6, for example a mirror, are bundled into a common light beam 15. The beam combiner 5 comprises a holographic optical element which is designed to deflect the projection light beam 11 and the measuring light beam 12 at different angles.

The common light beam 15 is then deflected by the second scanner 4 along a second axis 40. The second axis 40 is perpendicular to the first axis 30, thus being able to two-dimensionally scan the projection light beam 11 over the surface 10a to be scanned. The two scanners 3, 4 may thus be operated using different scanning frequencies. In particular, a second scanning frequency of the second scanner 4 is lower than a first scanning frequency of the first scanner 3.

By scanning the measuring light beam 12 only by means of the single-axis second scanner 4, the measuring light beam 12 is scanned as a line over the surface 10a to be scanned. To achieve a multi-dimensional scanning of the surface 10 to be scanned, it is advantageous for the second laser device 2 to be configured to emit several measuring light beams 12, 13, 14 which run in a parallel separated manner. Particularly high accuracy is achieved if each one of these separated multiple measuring light beams 12, 13, 14 in turn is additionally split into multiple beams using a beam splitter 7. For example, the beam splitter 7 can be integrated into the deflection element 6. In the first example embodiment shown, three measuring light beams 12, 13, 14 are emitted from the second laser device 2, each of the measuring light beams 12, 13, 14 being split again into three measuring light beams by means of the beam splitter 7, so that a total of nine measuring light beams can be scanned along a respective scan line 12A, 12B, 12C, 13A, 13B, 13C, 14A, 14B, 14C over the surface 10a to be scanned.

Figure 4:
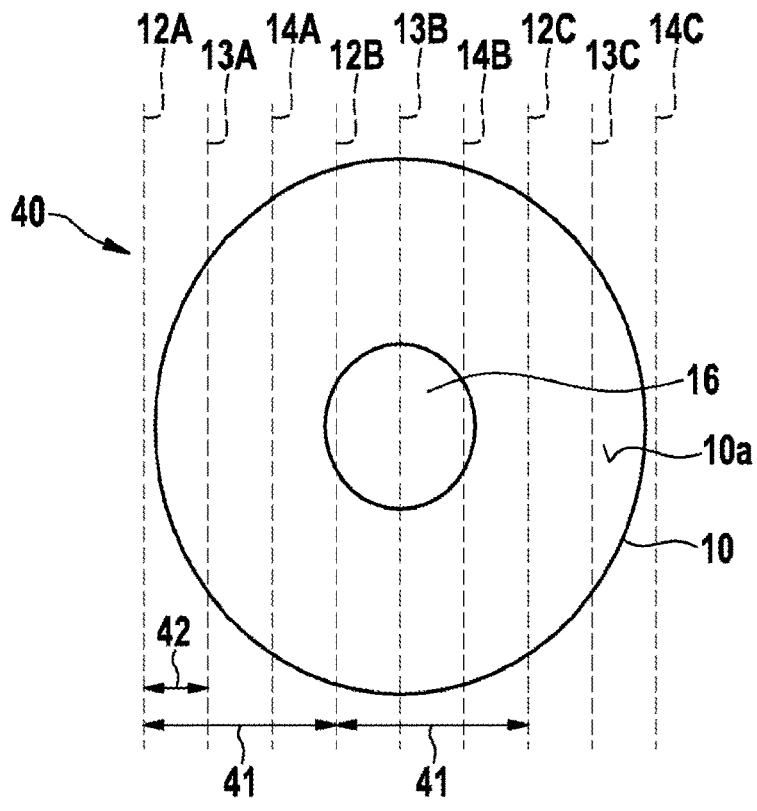
FIG. 4 is a simplified schematic representation of scan lines generated by means of the optical arrangement of FIG. 1.

The parallel scan lines 12A, 12B, 12C, 13A, 13B, 13C, 14A, 14B, 14C generated by means of the optical arrangement 20 on the surface 10a of the eye 10 to be scanned are schematically shown in FIG. 4, wherein the second laser device 2 and the beam splitter 7 are coordinated with each other so as to generate an interlaced line pattern 40 of the scan lines 12A, 12B, 12C, 13A, 13B, 13C, 14A, 14B, 14C on the surface 10a to be scanned. The interleaved line pattern 40 is characterized in that a first distance 41 between the respective resulting scan lines 12A, 12B, 12C, which is created by a single measuring light beam 12 emitted from the second laser device 2 downstream of the beam splitter 7, is greater than a second distance 42 between all of the nine resulting scan lines 12A, 12B, 12C, 13A, 13B, 13C, 14A, 14B, 14C. Thus, particularly precise detection of the viewing direction of the eye 10 can be enabled.

Performing determination of the viewing direction of the eye 10 is described in more detail below while making reference to a single measuring light beam 12. The viewing detection unit is configured to determine an optical path length of the measuring light beam 12 based on laser feedback interferometry of the measuring light beam 12 with a portion of the measuring light beam 12 backscattered by the eye 10.

First, the measuring light beam 12 is irradiated onto the eye 10. At the surface of the eye 10a, the measuring light beam 12 is at least partially backscattered, i.e. is at least partially reflected. In the process, the irradiated measuring light beam 12 is superimposed onto the portion of the backscattered portion of the irradiated measuring light beam 11 that propagates back in parallel in the direction of the second laser device 2.

The second laser device 2 comprises at least one surface emitter with integrated photodiode. Laser feedback interferometry is performed using the photodiode integrated in the surface emitter, to detect the resulting interference radiation, i.e. the superposition of the irradiated measuring light beam 12 and the backscattered radiation propagating in the opposite direction. Since the photodiode is integrated directly into the laser cavity of the surface emitter, the resulting interference radiation is herein detected here using the so-called self-mixing effect. The optical path length covered by the measuring light beam 12 can then be estimated on the basis of a frequency analysis.

Figure 5:
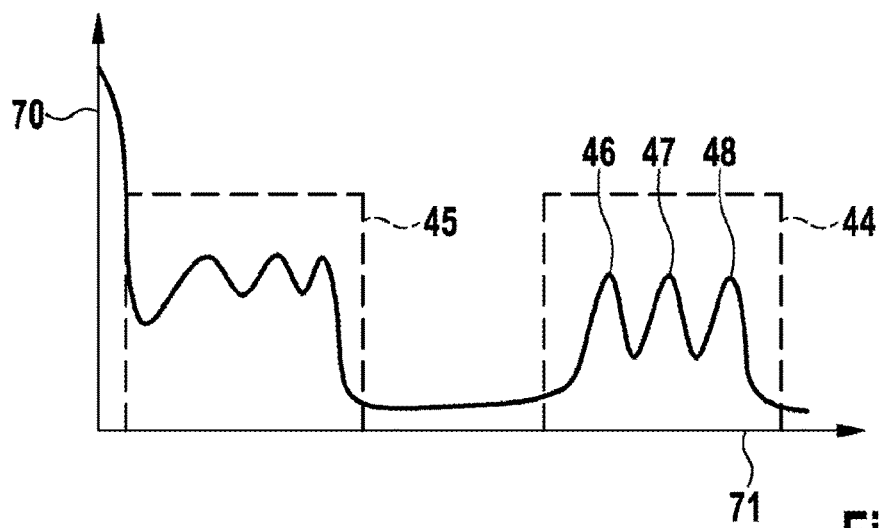
FIG. 5 is a simplified schematic representation of measurement data of the optical arrangement of FIG. 1.

An exemplary frequency spectrum of the resulting interference radiation, which can be detected using the integrated photodiode of the surface emitter, is schematically shown in FIG. 5. The axis 71 corresponds to the frequency and the axis 70 to the amplitude. In the diagram, the frequency of the detected interference radiation, determined for example by means of a Fourier analysis, is marked. Exemplary values for several different measuring light beams 12, 13, 14 are shown in the diagram.

Due to the triangular modulation of the wavelength of the irradiated measuring light beam 12, 13, 14, the peak frequency is dependent on an optical path length 2. Such measuring light beams 12, 13, 14, which in total cover a smaller optical path length, thus will result in a smaller frequency. If a measuring light beam 12, 13, 14 enters the eye 10 through the pupil 16, the corresponding optical path length, in this case up to the retina, is significantly longer than compared to an outside region of the eye 10. Corresponding peak frequencies 46, 47, 48 determined in this case are in the range 44 at higher frequencies .Peak frequencies occurring in the range indicate that the corresponding measuring light beam 12, 13, 14 in this measuring point has hit the outside of the eye 10.

The different peak frequencies, i.e. a frequency offset of the peak frequencies, within the areas 44 and 45, respectively, result from the different optical path lengths which the measuring light beams 12, 13, 14 cover between the optical arrangement 20 and the holographic optical deflection element 52a in the spectacle lens 52 (cf. FIG. 1). For example, a measuring light beam 12, 13, 14 deflected in the region of the edge 52c covers a shorter optical path length than a measuring light beam 12, 13, 14 deflected in the region of the edge 52b. This may also be used, due to the multiple scan lines 12A, 12B, 12C, 13A, 13B, 13C, 14A, 14B, 14C, to determine further more precise information on the instantaneous orientation of the eye 10, for example the position of the pupil 16 within the area 10a to be scanned.

Figure 6:
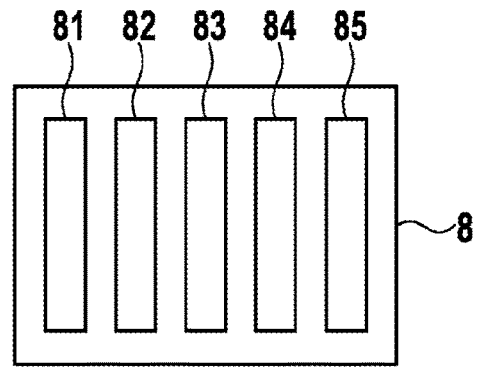
FIG. 6 is a simplified schematic view of a holographic optical element of the smart glasses of FIG. 1.

Another optimization of the described eye tracking may be achieved when using the holographic optical element 8, which is schematically shown in FIG. 6. The holographic optical element 8 can be used, for example, instead of the holographic optical deflection element 52a. The holographic optical element 8 has a plurality of holographic segments 81, 82, 83, 84, 85. Five holographic segments 81, 82, 83, 84, 85 are shown as an example. However, any number of holographic segments may be used. The holographic segments 81, 82, 83, 84, 85 are designed such that measuring light beams 12, 13, 14 scanned along the holographic segments 81, 82, 83, 84, 85 are differently deflected.

Figure 7:
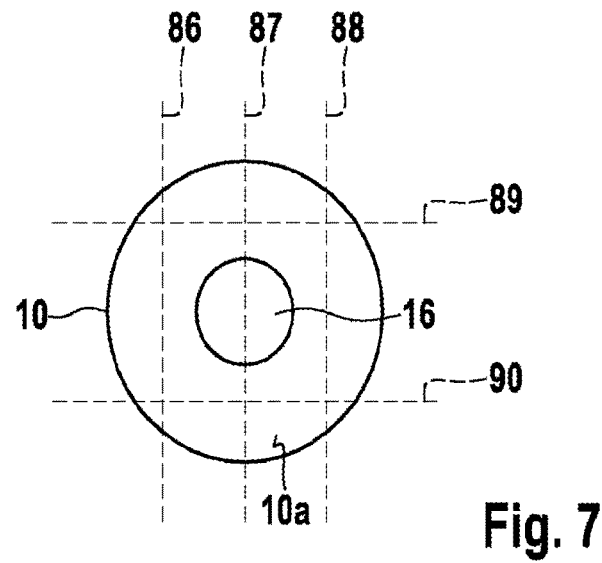
FIG. 7 is a simplified schematic view of scan lines deflected by the holographic optical element of FIG. 6.

In detail, the holographic optical element of FIG. 6 can be used to create the scan line pattern shown in FIG. 7. Each of the three vertical scan lines 86, 87, 88 results from deflecting exactly one measuring light beam at exactly one of the first three holographic segments 81, 82, 83 (cf. FIG. 6). If measuring light beams are scanned along one of the other two holographic segments 84, 85, these measuring light beams are deflected such that the corresponding scan lines 89, 90 are arranged perpendicular to the other three scan lines 86, 87, 88, i.e. horizontally. In this way, in particular the position and a movement of the pupil 16 of the eye 10 can precisely be detected in a wide variety of eye positions.

Figure 3:
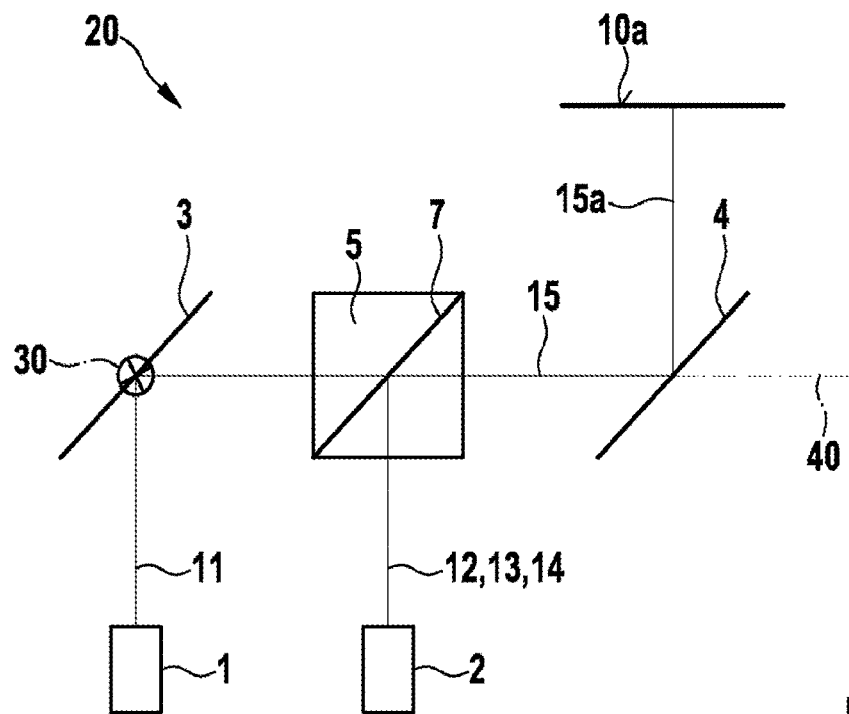
FIG. 3 is a detailed view of an optical arrangement according to a second example embodiment of the invention.

A variation of the optical arrangement 20 is shown in FIG. 3, representing a detailed view analogous to FIG. 2 of an optical arrangement 20 of smart glasses 50 according to a second example embodiment of the invention. The second example embodiment substantially corresponds to the first example embodiment of FIG. 1 with the difference of an alternative beam combiner 5. In the second example embodiment, the beam combiner 5 comprises a polarization beam splitter. The projection light beam 11 and the measuring light beams 12, 13, 14 are beamed into the polarization beam splitter such that they will be bundled. For this purpose, the projection light beam 11 and the measuring light beams 12, 13, 14 are polarized perpendicular to each other. In the polarization beam splitter, the beam splitter 7 is also integrated, which splits the incident measuring light beams 12, 13, 14 into several separate measuring light beams in each case. A polarization beam splitter may also provide a very simple and inexpensive optical arrangement 20.

The invention claimed is:

1. An optical arrangement for smart glasses, comprising:
   a first laser device configured to emit a projection light beam;
   a second laser device configured to emit a measuring light beam;
   a beam splitter configured and arranged to split the measuring light beam into at least two separate measuring light beams;
   a first scanner,
   a second scanner; and
   a beam combiner configured to combine the projection light beam and the measuring light beam into a common light beam,
   wherein the first scanner is configured to redirect the projection light beam emitted by the first laser device in a first axis
   wherein the second scanner is configured to redirect the common light beam emitted by the beam combiner in a second axis, and
   wherein a plurality of measuring light beams emitted from the second laser device and the beam splitter are aligned to produce an interlaced line pattern of scan lines on a surface to be scanned.

2. The optical arrangement according to claim 1, wherein the first scanner is configured to scan the projection light beam at a first scanning frequency, wherein the second scanner is configured to scan the common light beam at a second scanning frequency, and wherein the second scanning frequency is smaller than the first scanning frequency.

3. The optical arrangement according to claim 1, wherein the first laser device comprises a projection unit configured to project an image onto a retina of an eye of a user using the projection light beam.

4. The optical arrangement according to claim 1, wherein the second laser device comprises a viewing detection unit configured to determine an optical path length of the measuring light beam based on laser feedback interferometry of the measuring light beam with a backscattered portion of the measuring light beam from an eye, and to determine a viewing direction of the eye based on the optical path length.

5. The optical arrangement according to claim 1, wherein the first scanner and/or the second scanner comprises a micro mirror actuator.

6. The optical arrangement according to claim 1, wherein the beam combiner comprises a polarization beam splitter, and wherein the projection light beam and the measuring light beam are polarized perpendicular to each other.

7. The optical arrangement according to claim 1, wherein the beam combiner comprises a holographic optical element which is designed to deflect the projection light beam and the measuring light beam at different angles.

8. The optical arrangement according to claim 1, wherein the second laser device is configured to emit a plurality of separate measuring light beams.

9. The optical arrangement according to claim 8, further comprising a holographic optical element having a first holographic segment and a second holographic segment, wherein the two holographic segments are formed such that a first scanning direction of a measuring light beam deflected at the first holographic segment is inclined at an angle in relation to a second scanning direction of a measuring light beam deflected at the second holographic segment.

10. The optical arrangement according to claim 1, wherein the beam splitter:
   is integrated into the second laser device;
   is arranged on the second laser device;
   is integrated into the beam combiner; or
   is integrated into a deflecting element provided for deflecting the measuring light beam.

11. The optical arrangement according to claim 1, wherein the second laser device comprises at least one surface emitter with integrated photodiode.

12. A pair of smart glasses comprising the optical arrangement according to claim 1, wherein the optical arrangement is arranged on an eyeglass temple.

13. The pair of smart glasses according to claim 12, further comprising an eyeglass lens with a holographic optical deflection element, wherein the holographic optical deflection element is configured to deflect all light beams emitted by the optical arrangement towards an eye of a user of the pair of smart glasses.

* * * * *